May 6, 1924.
R. ADAMSON ET AL
RAILWAY LOCOMOTIVE
Filed April 6, 1922
1,492,914
4 Sheets-Sheet 1
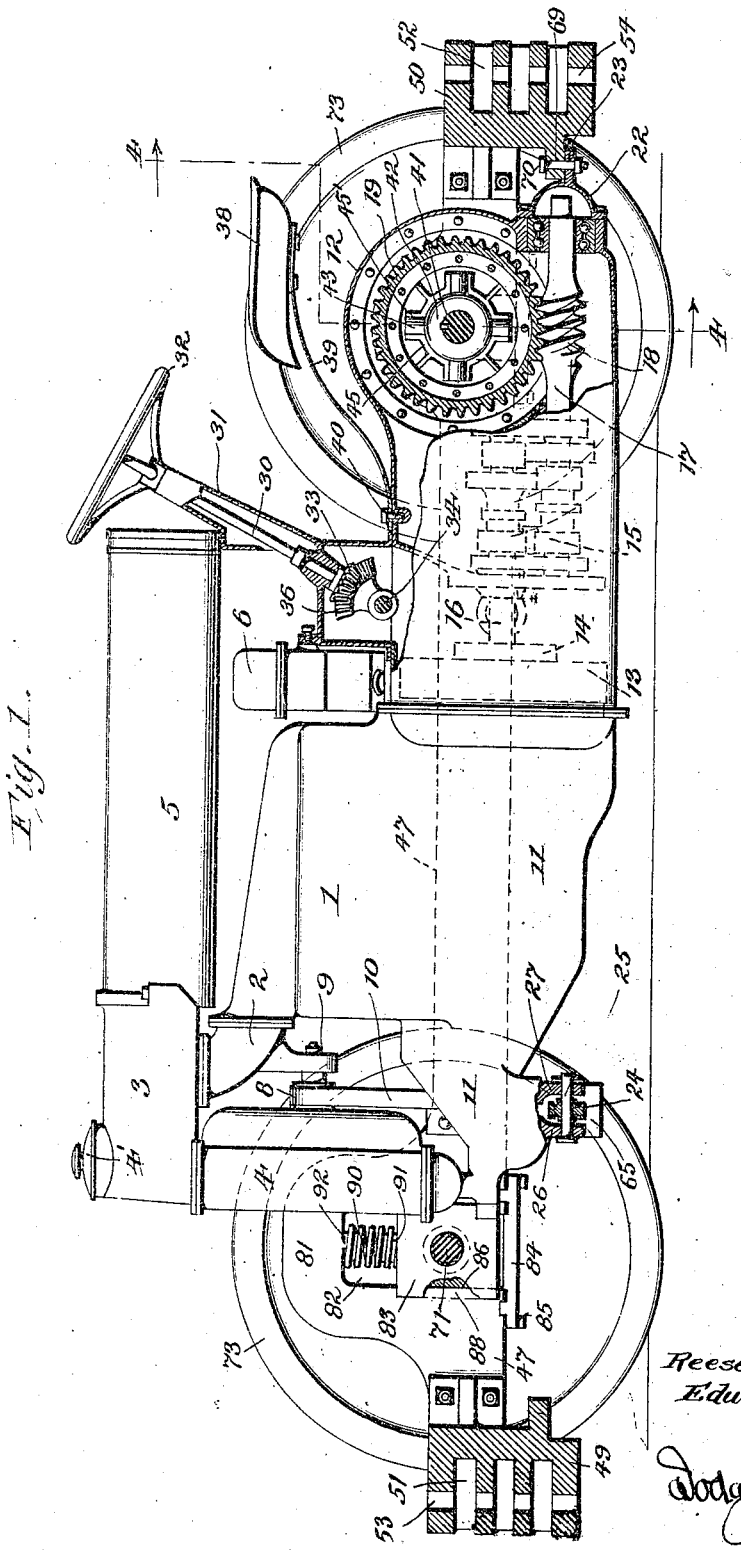
Inventors
Reese Adamson
Edward T. Beatty
Dodge and Sons
Attorneys

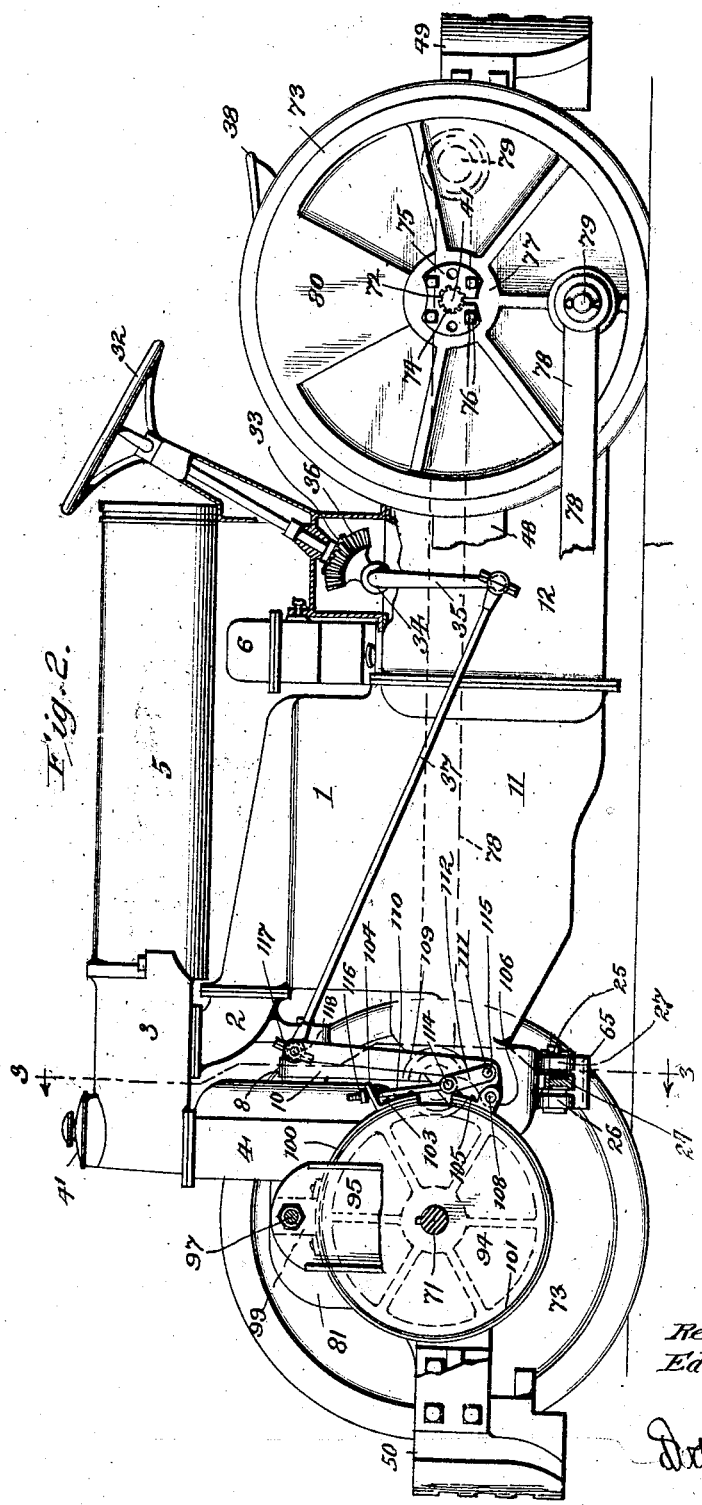

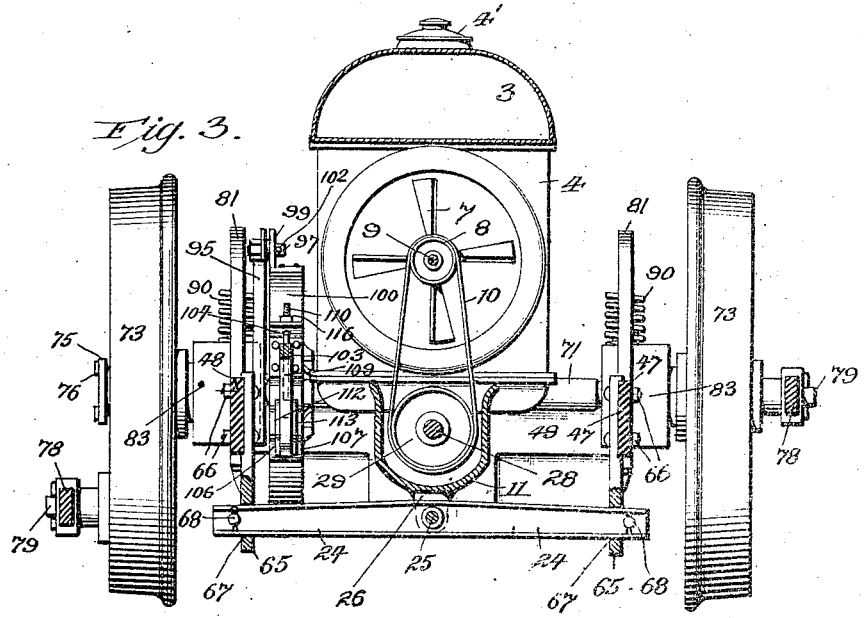

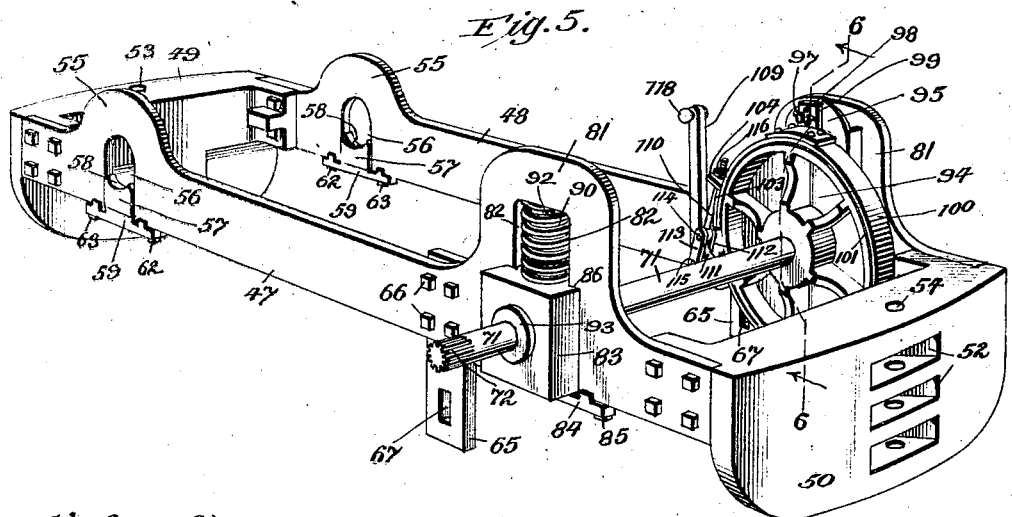
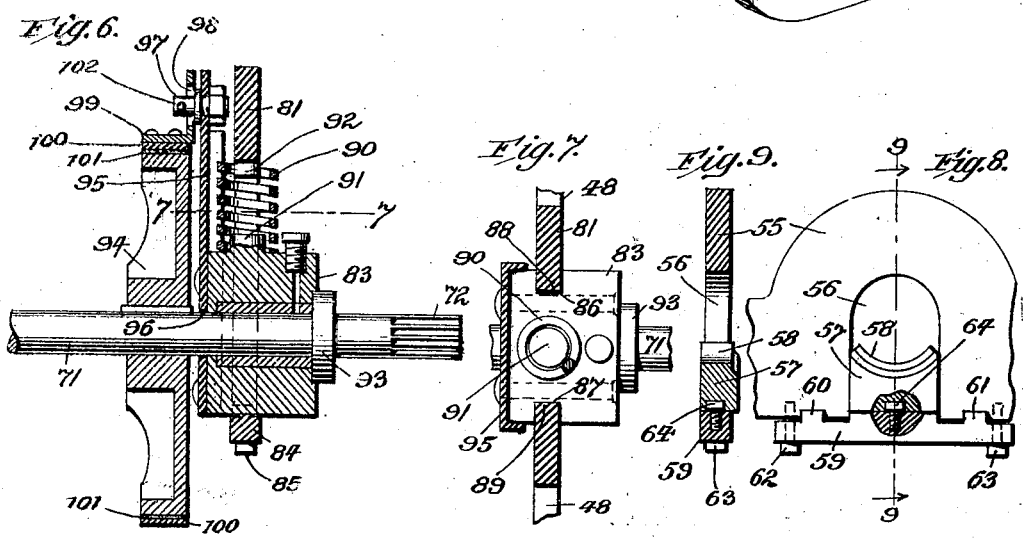
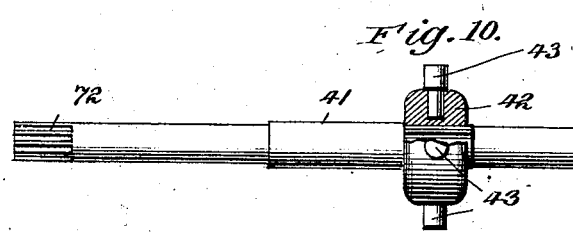

Patented May 6, 1924.

UNITED STATES PATENT OFFICE.

REESE ADAMSON AND EDWARD T. BEATTY, OF BIRMINGHAM, ALABAMA.

RAILWAY LOCOMOTIVE.

Application filed April 6, 1922. Serial No. 550,129.

*To all whom it may concern:*

Be it known that we, REESE ADAMSON and EDWARD T. BEATTY, citizens of the United States, residing at Birmingham, in the county of Jefferson and State of Alabama, have invented certain new and useful Improvements in Railway Locomotives, of which the following is a specification.

This invention pertains to that type of railway locomotive which utilizes an internal combustion engine as the source of power to drive the wheels of the locomotive.

Primarily the object of the invention is the designing of a railway truck attachment for the well-known tractor commercially known as the "Fordson," whereby the same is converted, either permanently or temporarily as desired, into a locomotive adapted to be propelled by the tractor motor and provided with railway car wheels so that it may be run on rails. Among the numerous adaptations of such a locomotive might be mentioned, for instance, its use in hauling cars, or even trains of cars, in coal mines, ore mines, quarries, brick-yards, saw-mills, sugar plantations and many other industries. Economy of operation and low initial cost over other locomotives designed for such uses, whether steam propelled or otherwise, are among the principal objects sought to be attained by the present invention. A further feature is the utilization of certain of the parts of the tractor steering mechanism to actuate the brake mechanism of the locomotive. The truck attachment with which the tractor is combined is made of sufficiently rugged construction, and the connections between the truck and the tractor body are particularly designed, to amply resist and distribute the severe shocks and strains to which such a device is subjected without danger of damage to the less rugged parts of the tractor.

Another of the principal objects sought is the designing of the truck attachment and the other parts of the invention, so that the changes necessary in the parts of the Fordson, or such other similar tractor or device as may be used, are reduced to a minimum. In the preferred form of the invention which is now in practical use, the following are, briefly, the changes which are made in the Fordson tractor. All four wheels of the tractor are removed, as are also the tractor differential gearing and the two-part rear axle of the tractor since as the locomotive runs on rails there is no need of these parts. The rear axle housing parts of the tractor are retained, and in lieu of the parts removed therefrom there is provided a special single piece rear axle shaft the extremities of which receive two of the railway truck wheels, while the center portion of the axle shaft is rigidly connected to the ring worm-wheel of the tractor. Consequently the rear car wheels are driven in synchronism from the internal combustion engine of the tractor, through the tractor's crank-shaft, clutch, upper and lower transmission shafts together with their three-speed-forward and one-speed-to-the-rear transmission gearing, and worm-wheel, and the special rear axle described. The steering mechanism associated with the front axle of the tractor being unnecessary is removed, although the drag-link extending along the side of the tractor together with the remaining steering mechanism, such as the steering-wheel, steering shaft and other steering parts adapted to actuate the drag-link mentioned, are retained to operate the brake mechanism of the locomotive as stated heretofore. The original outer portions of the tractor's front axle are severed a short distance back from the extremities of the axle, the axle thus modified serving as the means for supporting the front end of the tractor body in the railway truck in the manner hereinafter described.

An axle mounted in vertically-movable cushioned bearings in the front end of the truck serves as the front axle of the locomotive on the extremities of which are suitably mounted a second pair of railway car wheels. The brake mechanism of the locomotive is associated with this front axle and, as stated, is adapted to be actuated by rotation of the steering-wheel of the tractor.

Other features of construction and arrangement of the parts of the locomotive will be apparent from the accompanying drawings and the detailed description given below.

In the accompanying drawings, which illustrate a practical embodiment of the invention now in actual use, like reference numerals indicate the same or like parts throughout the several views.

Fig. 1 represents a side elevational view of the tractor combined with the special railway truck as contemplated by the invention, the truck being shown in section and certain parts of the tractor body broken away in order to more clearly disclose the arrangement of the tractor within the truck and the relative positions of the various parts thereof;

Fig. 2, a side elevational view, somewhat similar to Fig. 1, portions of the tractor and the truck frame being broken away to show the brake mechanism used in connection with the front axle of the truck, and the manner in which certain parts of the tractor's steering mechanism are utilized to actuate the brake;

Fig. 3, a vertical section taken on line 3—3 of Fig. 2, showing certain details of the brake mechanism and the manner in which the front end of the tractor is supported in the railway truck;

Fig. 4, a vertical section taken on line 4—4 of Fig. 1, showing certain parts of the power transmission mechanism and the manner in which the rear end of the tractor is connected to the railway truck;

Fig. 5, a perspective view of the specially designed railway truck with the tractor and wheels removed;

Fig. 6, a vertical section taken on line 6—6 of Fig. 5, showing certain parts of the brake mechanism and the manner in which the truck frame is supported by the front axle;

Fig. 7, a horizontal section taken on line 7—7 of Fig. 6, showing the arrangement of one of the front axle bearing boxes in the truck frame;

Fig. 8, a fragmentary elevational view of one of the means provided in the side frames of the truck to receive the rear axle housing of the tractor;

Fig. 9, a vertical section taken on line 9—9 of Fig. 8; and

Fig. 10, a side elevation of the specially designed rear axle for the tractor.

In proceeding with a detailed description of the invention, as shown in the drawings, such of the principal parts of the Fordson tractor as are retained will be referred to first. Represented at 1 in the drawings is the water-jacketed motor of the tractor; 2 is the connection between the water jacket of the motor 1 and top tank 3 of radiator 4; and 4' is the radiator cap. The fuel tank is shown at 5; the air-washer at 6; the fan at 7; the fan pulley at 8; the fan shaft at 9; and the fan belt at 10. The main body of the tractor comprises motor 1; the crank case 11; the rear housing 12, which encloses, principally, fly-wheel 13, clutch 14, transmission gearing 15, upper transmission shaft 16, lower transmission shaft 17 provided with worm 18, and worm-wheel 19; and the two parts 20, 21 of the rear axle housing. Bolted to the rear end of housing 12 is the draw-bar cap 22 provided with a vertical opening or openings 23 ordinarily used to attach any apparatus to be drawn by the tractor, such for instance as a plow or a harrow. At 24 is the front axle of the tractor which is centrally perforated to receive trunnion pin 25, the latter also passing through and being suitably secured in a pair of perforated lugs 26, 27 on crank case 11 to pivotally support the front end of the tractor.

The crank-shaft of the tractor is shown at 28, the fan drive pulley 29 being mounted on the forward end of the same. On the upper end of the steering shaft 30, which is mounted in a steering column 31, is the steering-wheel 32; while on the lower end of shaft 30 is mounted the steering pinion 33. In the upper part of the housing 12 is mounted a cross shaft 34 having a depending arm 35 on its outer end and an upstanding gear sector 36 on its inner end with which pinion 33 on the lower end of the steering shaft 30 meshes. A drag-link 37 extends along the side of the tractor and at its rear end is connected to arm 35 of shaft 34 by the usual ball and socket joint. Thus it will be seen that rotation of steering-wheel 32 in either direction will cause drag-link 37 to be shifted longitudinally backward or forward according to the direction of rotation of the steering-wheel 32. The seat for the operator is shown at 38, the same being suitably mounted on the upper end of a metal spring member 39 having its lower end bolted at 40 to the upper part of housing 12.

Since the device is to be run on rails there is no need for the differential gearing and the two-part rear axle shaft with which the tractor is ordinarily provided. Hence a specially designed one-piece rear axle shaft 41 is used in place of the usual tractor axle, the same being mounted in the original axle bearings of the tractor. Keyed to the center of rear axle 41 is a spider block 42 having a series of radially projecting pins 43 provided thereon. The original differential housing members 44, 45 of the tractor, having corresponding series of concave seats 44', 45' respectively, enclose ring worm-wheel 19 and surround spider block 42 with pins 43 resting in the series of seats 44', 45'. Suitable bolts 46 secured in openings provided therefor in ring worm-wheel 19 and differential housing members 44, 45 serve to clamp the several parts rigidly together so that upon rotation of worm-wheel 19 rear axle 41 will be rotated through the several parts just described.

The specially designed truck in which the tractor body is supported is composed of principally the side frame members 47, 48 and the end bumper yokes 49, 50, all suitably bolted together at their points of connection at the corners of the truck to form a rigid truck frame adapted to withstand the hard usage to which it must necessarily be subjected. The outer surfaces of bumper yokes 49, 50 are provided centrally with a vertical series of recesses 51, 52 respectively, adapted to receive the coupling members of the first of the cars being drawn by the locomotive. A series of openings 53, 54 are provided in bumper yokes 49, 50 respectively to receive the usual coupling pins used to connect the coupler members to the locomotive.

The truck frame is so designed that the tractor body and the truck may be rigidly connected together without any possibility of looseness or undue vibration between the parts of the tractor and those of the truck frame. In order to connect the rear end of the tractor body and the truck frame, the side frame members 47, 48 of the truck, which are similar in construction, and only one of which need be described, are each formed with an upwardly curved portion 55 and a vertical slot 56 extending upwardly from the lower edge of the frame member into the curved portion 55. These slots 56, 56 receive the outer portions of tapering rear axle housing sections 20, 21 of the tractor, as shown in Fig. 4, the latter fitting snugly into the upper curved ends of the slots 56, 56. In the lower end of each slot 56 is located a filler block 57 having a curved upper edge 58 to conform to the contour of the rear axle housing of the tractor; while the lower end of the slot 56 is closed by a cap 59 having lugs 60, 61 engaging with corresponding recesses in the lower edge of the side frame member and secured to the frame member by cap-screws 62, 63. A cap-screw 64 is mounted in the center of the upper face of cap 59 and projects into a corresponding recess in the lower face of filler block 57 to retain the latter in proper position. Thus it will be seen that by screwing cap-screws 62, 63 into both side frame members 47, and 48, the rear end of the truck frame is rigidly clamped to the sections 20, 21 of the rear axle housing of the tractor and the truck and tractor body firmly connected together at this point. The width of the truck is such that the frame members 47, 48 engage the tapering or curved portions of the axle housing of the tractor; hence, when screws 62, 63 on each of the frame members are tightened, there is no possibility of relative lateral movement between the side frame members of the truck and the body of the tractor.

At its forward end the tractor body is suspended in the truck frame by means of the front axle 24 of the tractor, portions of the outer ends of which have been cut off to make it more nearly correspond in length to the width of the truck frame. In order to receive the severed ends of front axle 24 of the tractor, so that the tractor body may be supported in a horizontal plane, side truck frame members 47, 48 are each provided towards their forward ends with a depending bracket 65 rigidly secured at its upper end to the frame members of the truck by bolts and nuts 66. The outer ends of the tractor front axle 24 each pass through a suitable opening 67 provided in the lower end of each bracket 65 for this purpose, while the axle 24 is left sufficiently long to project somewhat beyond the outer faces of the brackets 65. The extremities of axle 24 are perforated to receive pins 68 which are suitably secured therein to prevent possible lateral shifting of the tractor front axle 24 and consequent shifting of the forward end of the tractor body relative to the truck frame.

From the above description it will be seen that the tractor body and the truck frame are rigidly connected so as, in effect, to form practically a single unitary structure adapted to readily withstand the jars to which the locomotive will necessarily be subjected with small likelihood of damage to the parts. Further means are provided however to share or distribute more generally to the parts of the tractor the jars and strains to which the truck frame is subjected. The rear bumper yoke 50 which forms the rear end of the truck frame has formed centrally of its inner face a vertically perforated lug 69 which, as shown in Fig. 1, overlaps the outer perforated end of drawbar cap 22 of the tractor body, and is securely bolted thereto at 70 through the registering perforations of the two parts. By reason of this connection between the tractor body and the truck frame, the rear axle housing sections 20, 21 of the tractor body are relieved of a considerable amount of the strains and jars incident to hauling of cars or other apparatus.

Rear driving axle 41 serves as the rear axle of the locomotive, and axle 71 as the front axle. The extremities of both of these axles are the same as those of the original tractor axles, each being provided with a series of slots 72, which when the car wheels 73 are placed thereon receive the corresponding ribs 74 of the well-known split taper bushing 75 of the tractor. Cap-screws 76 secure the bushing 75 to the hub 77 of the wheel 73, whereby, due to the engagement of the tapered portion of the bushing 75 within the tapered opening in the hub 77 of the wheel (not shown), the corresponding slots and ribs of the bushing and axle are brought into firm clamping engagement with each other to secure the wheel 73 in place on the axle.

A connecting rod 78 mounted freely at each end on a crank-pin 79 secured in each wheel 73 serves to connect the pairs of wheels 73 on either side of the locomotive to transmit the driving power to all four wheels. Each wheel 73 diametrically opposite its crank-pin 79 is provided with a counterweight 80 for a purpose well understood.

It is desirable, in order to prevent twisting of the truck frame and consequent distortion or loosening of the parts of the locomotive due to unlevel tracks, to mount the front axle 71 of the truck in the truck frame so that either or both ends of the axle may move vertically with reference to the truck frame within which it is mounted. Accordingly the forward portions of side frame members 47, 48 of the truck, which as stated are similar to each other, are each formed with an extension 81 on its upper edge. A slot 82 extends from the lower edge of the frame member upwardly into extension 81, and receives a bearing box 83 in which one end of axle 71 is journalled. A cap 84, somewhat similar to cap 59 for the rear axle mounting, is secured to the lower edge of the side frame member of the truck over the open end of slot 82 by means of cap-screws 85, and serves to retain bearing box 88 in the slot. As shown in Fig. 7, bearing box 83 is wider than slot 82 and is provided with vertical grooves 86, 87 on either side thereof in which the vertical edges 88, 89 respectively of the frame member of the truck enclosing recess 82 have a sliding fit to permit any necessary vertical movement of bearing box 83. In order to cushion the support of the frame member on bearing box 83, a heavy coil spring 90 is interposed between the upper face of bearing box 83, which has a lug 91 to hold the lower end of the spring in place, and the upper end of slot 82, where a lug 92 on the inner edge of extension 81 serves to retain the upper end of spring 90. A bearing box collar 93 is provided on the outer end of the axle 71 adjacent bearing box 83.

In Figs. 2, 3, 5, 6 and 7 is illustrated the brake mechanism for the locomotive, the same being adapted to operate on the front axle 71 of the truck and to be operated itself by manipulation of the otherwise useless steering-wheel 32 of the tractor through certain parts of the tractor steering mechanism which are retained for this purpose. A brake-wheel 94 is keyed on to axle 71 near one end thereof adjacent the inner face of bearing box 83. A vertical brake hanger member 95 is suitably attached at its lower end to the inner face of bearing box 83 and has an opening 96 therein for the axle 71. In the upper end of hanger member 95 there is suitably mounted a hanger pin 97 the inner end of which passes through a vertical slot 98 in the vertical portion of a hanger bracket 99 rigidly secured to the upper part of brake band 100 having a brake lining 101. A cross pin 102 secured in the inner end of hanger pin 97 serves to prevent possible disengagement of the hanger pin 97 from slot 98 of hanger bracket 99. Thus means are provided to maintain the brake band in proper position with reference to the other parts and yet permit such movement of the parts as may be necessary in actuating the brake.

On one end of brake band 100 there is secured a bracket 103 having a perforated upstanding portion 104. The adjoining end of brake band 100 is also provided with a second bracket 105 having upstanding perforated lugs 106, 107 in which is secured a cross pin 108. On the latter is pivotally mounted the lower perforated end of a brake lever 109. The upper end of an adjusting screw 110 passes through the opening in bracket 103, while the lower end of the screw is perforated. Brake lever 109 is also perforated at its bend 111. The lower end of adjusting screw 110 and bend 111 of brake lever 109 are pivotally connected by a pair of links 112, 113 perforated at their ends to receive cross pins 114, 115 which also pass through the perforation in the lower end of screw 110 and the perforation in the bend 111 of brake lever 109 respectively and are suitably secured therein to maintain the parts in place. A nut 116 on the upper threaded end of adjusting screw 110 above bracket 103 when rotated serves to adjust the brake band 100 with reference to the outer periphery of brake-wheel 94 as will be readily understood.

Referring now to the parts of the steering mechanism of the tractor heretofore described, drag-link 37 (Fig. 2) at its forward end is provided with the usual socket 117, while in the upper end of brake lever 109 there is mounted a ball member 118, these parts being connected to form the usual ball and socket joint. As will be readily understood, rotation of wheel 32 will, through the connections of the parts described, cause the brake to be applied or released according to the direction in which wheel 32 is rotated.

Although the invention, as stated among the principal objects sought to be accomplished and as illustrated in the drawings and more particularly described above, makes use of the Fordson tractor as the vehicle with which the specially designed railroad truck is combined, it is not intended that the invention be limited to a locomotive of which this particular tractor, or rather such parts thereof as are used, forms a part. A feature, or features, of the invention, it is contemplated, might well be adapted for use in a locomotive of the character described having any other suitable tractor, or similar vehicle forming an element of the combination. Necessary changes may be made for this purpose without departing from the scope of the present invention.

The terms " vehicle body " or " tractor body" as used in the appended claims refer to the engine 1, the crank case 11, rear housing 12, and rear axle housing sections 20, 21 of the Fordson tractor, these being the parts of the tractor which in general form the main body or frame of the tractor. These terms are used however in their broad sense and are intended to include the main body or frame of any type of tractor or other vehicle which may be used irrespective of what parts thereof go to make up the main body or frame of the vehicle.

What we claim is:—

1. A locomotive of the character described comprising in combination, a tractor body, including a motor; a driving axle mounted in said tractor body; driving means connecting the motor and the driving axle; a truck frame within which said tractor body is mounted; an axle mounted in said truck frame; brake mechanism associated with said truck axle; a rotatable hand wheel located on said tractor body and normally forming a part of the steering gear thereof; means connecting said rotatable wheel and the brake mechanism to actuate the latter by rotation of said wheel; and railway car wheels mounted on said truck axle and said driving axle.

2. The combination in a locomotive of the character described, of a tractor body; a truck frame in which said tractor body is mounted; an axle for one end of said truck frame; a second axle for the opposite end of said frame; railway car wheels mounted on said axles; a rotatable hand wheel located on said tractor body and normally forming a part of the steering gear thereof; brake mechanism associated with one of said axles; and means for actuating said brake mechanism by rotation of said hand wheel.

3. The combination with the body of a tractor of the type described, including a rear axle housing, of a truck frame within which said tractor body is located; means for supporting the front end of the tractor body within said truck frame, the rear end of said truck frame being mounted on the rear axle housing of the tractor body; means connecting the rear end member of said truck frame to the rear end of the tractor body; an axle mounted in said rear axle housing; a front axle for said truck frame; and railway car wheels mounted on said front and rear axles.

4. The combination with the body of a tractor of the type described including a motor and a rear axle housing, and having a front axle, a rear axle and driving means connecting said motor and said rear axle, of a rectangular truck frame within which said tractor body is located, the front end of the tractor body being connected to said truck frame to support the front end of the tractor in the truck frame, while the outer ends of the rear axle housing of said tractor body project through and are secured to the side members of said truck frame; a front axle for the truck frame; and railway car wheels mounted on the front axle of the truck frame and the rear axle of the tractor.

5. The combination with the body of a tractor of the character described including a rear axle housing, of a truck frame within which said tractor body is located, the front end of said tractor body being supported by the front end of said truck frame, while the rear end of the truck frame is supported by said tractor body; an axle mounted in said rear axle housing; a front axle for said truck frame; railway car wheels mounted on said front and rear axles; brake mechanism associated with said front axle; a rotatable hand wheel located on said tractor body and normally forming a part of the steering gear thereof; and means connecting said hand wheel and said brake mechanism to actuate the brake mechanism by rotation of the hand wheel.

6. A locomotive of the character described comprising in combination, a tractor body, including a motor and a rear axle housing, and having a rear draw-bar cap; a driving axle mounted in said rear axle housing; driving means connecting the motor and said driving axle; a truck frame within which said tractor body is located; means for supporting one end of the tractor body in said truck frame; an axle mounted in said truck frame; means for securing the rear end of the truck frame to the outer ends of said rear axle housing; means rigidly connecting said drawbar cap to the rear end member of the truck frame; and railway car wheels mounted on said truck axle and said driving axle.

7. The combination with a tractor having its wheels removed, of a railway truck frame, means to mount the tractor on said frame, a forward axle with car wheels mounted thereon, journals for said axle, pedestals and equalizing springs for said axle to permit vertical play thereof, means to mount car wheels on the rear axle, and means to couple said rear wheels for joint non-differential driving from the tractor motor.

8. A railway truck attachment for tractors, comprising a truck frame, a forward supporting axle for the frame, journals therefor mounted directly on said frame, pedestals and equalizing springs on said frame for said journals, forward car wheels on said axle, and means to mount a tractor on said frame with the ends of its rear axle disposed to receive rear driving car wheels for the truck.

9. A railway truck attachment for tractors as described in claim 8, in which said means to mount the tractor on the truck comprises underhung brackets for the tractor's forward axle, bearing seats for the tractor's rear axle housing, and means to clamp said housing to said seats.

10. A truck attachment for tractors, comprising an elongated railway truck frame, a forward truck axle having car wheels thereon, means to directly mount said axle for vertical equalizing play on the truck, means to mount on said frame a tractor having its tractor wheels removed from its rear axle, and means to mount the rear driving car wheels for the truck on said rear tractor axle.

11. A truck attachment as described in claim 10, in which the front and rear wheels on the same side of the truck are coupled together to make drivers of all four wheels.

12. The combination with a tractor having its wheels removed, of a railway truck frame, means to mount the tractor on said frame, a forward axle with car wheels mounted thereon, means to mount said axle for vertical equalizing play on the truck, rear driving wheels for the truck mounted on the rear tractor axle, and a non-differential tractor drive for said wheels.

13. A railway truck attachment for tractors as described in claim 8, in which the truck frame has forward underhung bracket supports for the front tractor axle, rear bearings for the tactor's rear axle housing, and removable means to secure the tractor detachably in position in said brackets and bearings.

In testimony whereof we have signed our names to this specification.

REESE ADAMSON.
EDWARD T. BEATTY.